United States Patent [19]

Kjellqvist et al.

[11] Patent Number: 4,673,875

[45] Date of Patent: Jun. 16, 1987

[54] APPARATUS INCLUDING CONTACT FREE TRANSFER OF SIGNALS FOR MEASURING THE GAP BETWEEN RELATIVELY ROTATING REFINER DISCS

[75] Inventors: Olof G. Kjellqvist, Täby; Bengt O. Åkerblom, Vällingby, both of Sweden; Axel H. Sjöbom, Bellevue, Wash.

[73] Assignee: Sunds Defibrator Åktiebolag, Sweden

[21] Appl. No.: 758,288

[22] Filed: Jul. 24, 1985

[30] Foreign Application Priority Data

Aug. 15, 1984 [SE] Sweden ................................ 8404100

[51] Int. Cl.[4] .......................... G01B 7/14; B02C 7/14; G08C 19/06; G08C 19/36
[52] U.S. Cl. ...................................... 324/207; 241/37; 340/870.29; 340/870.31
[58] Field of Search ................. 324/207, 208, 219–221; 241/37; 340/870.28, 870.29, 870.31, 870.32; 455/606, 613; 73/660

[56] References Cited

U.S. PATENT DOCUMENTS

| 2,548,599 | 4/1951 | Garr . | |
|---|---|---|---|
| 3,434,670 | 3/1969 | May . | |
| 3,500,179 | 3/1970 | May | 324/208 |
| 3,831,084 | 8/1974 | Scalese et al. | 324/219 X |
| 4,134,067 | 1/1979 | Woodbury | 324/219 |
| 4,229,696 | 10/1980 | Gustafson | 324/207 |
| 4,387,339 | 6/1983 | Akerblom | 324/207 |
| 4,441,078 | 4/1984 | Lecomte | 324/219 |
| 4,454,991 | 6/1984 | Brenholdt . | |

FOREIGN PATENT DOCUMENTS 401896 6/1978 Sweden .
414457 8/1980 Sweden .

Primary Examiner—Gerard R. Strecker
Attorney, Agent, or Firm—Lerner, David, Littenberg, Krumholz & Mentlik

[57] ABSTRACT

Apparatus for measuring the gap between pairs of relatively rotating refiner discs is disclosed, including a transmitter incorporated into the face of a rotating refiner disc for producing a measurement signal in response to changes in reluctance corresponding to changes in the gap, a circuit for supplying the current to the transmitter, including a transformer for contact-free transfer of the current to the transmitter, a stationary receiver for receiving the measurement signal generated by the transmitter, and a signal transmitter for contact-free transfer of the measurement signal to the stationary receiver.

3 Claims, 2 Drawing Figures

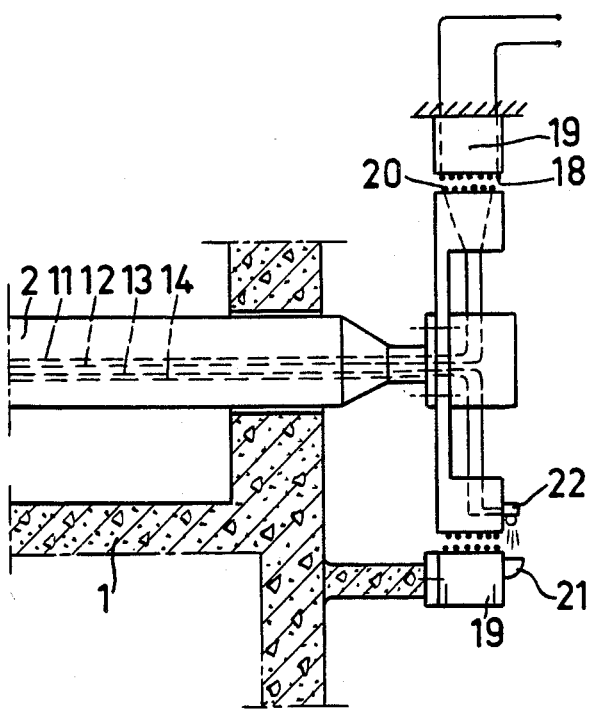

APPARATUS INCLUDING CONTACT FREE TRANSFER OF SIGNALS FOR MEASURING THE GAP BETWEEN RELATIVELY ROTATING REFINER DISCS

FIELD OF THE INVENTION

The present invention relates to refiners for lignocellulose containing material. More particularly, the present invention relates to apparatus for measuring the gap between two relatively counter-rotating refiner discs contained in such refiners.

BACKGROUND OF THE INVENTION

In U.S. Pat. No. 4,387,339 a method and apparatus are disclosed for indicating the width of the gap between the refiner discs in a refiner by means of reluctance measurement. The object of this approach is to prevent metallic contact between the refiner discs. A transmitter is defined in detail in this patent, and is disclosed as being inserted in the surface of one of the refiner discs (the stationary disc).

In order to achieve optimum measurement in such a device, the transmitter is formed as an integral part of the surface of the refiner disc, and in that manner the transmitter is worn in a similar manner to that of the beating surface. Therefore, the real distance between the refiner discs is indicated at all times. In order to function, the transmitter requires a current supply. Furthermore, the results of these measurements must be transferred from the transmitter to a receiver.

The aforesaid arrangement can be easily applied to refiners which include only one disc which rotates and a second disc which is stationary. The transmitter can then be placed on the stationary disc, and no problems then arise with respect to either the current supply or utilization of the measurement signals. In a refiner comprising two counter-rotating refiner discs, however, problems arise with the transfer of the electrical supply and of the measurement signals between the transmitter on the rotary disc and the stationary parts of the refiner.

SUMMARY OF THE INVENTION

In accordance with the present invention, these and other problems have now been solved by the provision of contact-free transfer between the axle of a rotating refiner disc and the refiner stand or stationary portion of the refiner. In particular, in accordance with a preferred embodiment of the apparatus of the present invention, these objectives are achieved by the provision of apparatus for measuring the gap between a pair of relatively rotating refiner discs including opposing faces for refining lignocellulose-containing material between those opposing faces and comprising rotating means for rotating at least one of the refiner discs so that the pair of refiner discs rotates with respect to each other on opposite sides of a plane between the opposing faces thereof, transmitter means incorporated into the face of the rotating disc for producing a measurement signal in response to changes in reluctance corresponding to changes in the gap, current supply means for supplying electric current to the transmitter means, including transformer means for contact-free transfer of the current to the transmitter means, stationary receiver means for receiving the measurement signal, and measurement signal transfer means for contact-free transfer of the measurement signals from the transmitter to the stationary receiver.

In accordance with one embodiment of the apparatus of the present invention, means are provided for rotating both of the refiner discs in opposite directions.

In accordance with another embodiment of the apparatus of the present invention, the rotating means includes an axle upon which the rotating refiner disc rotates. Preferably, the measurement signal transfer means includes transmitting means mounted on that axle. In another embodiment, the transformer means includes a first winding mounted on that axle and a second winding mounted adjacent to the first winding.

In accordance with another embodiment of the apparatus of the present invention, the transmitting means includes a plurality of lamps mounted on the axle, and the stationary receiver means comprises a photodiode.

BRIEF DESCRIPTION OF THE DRAWINGS

The present invention may be more fully understood with reference to the following detailed description, which in turn refers to the enclosed drawings, in which;

FIG. 2 shows a partial schematic representation of a side view of another embodiment of the apparatus of the present invention.

DETAILED DESCRIPTION

Figure 1:
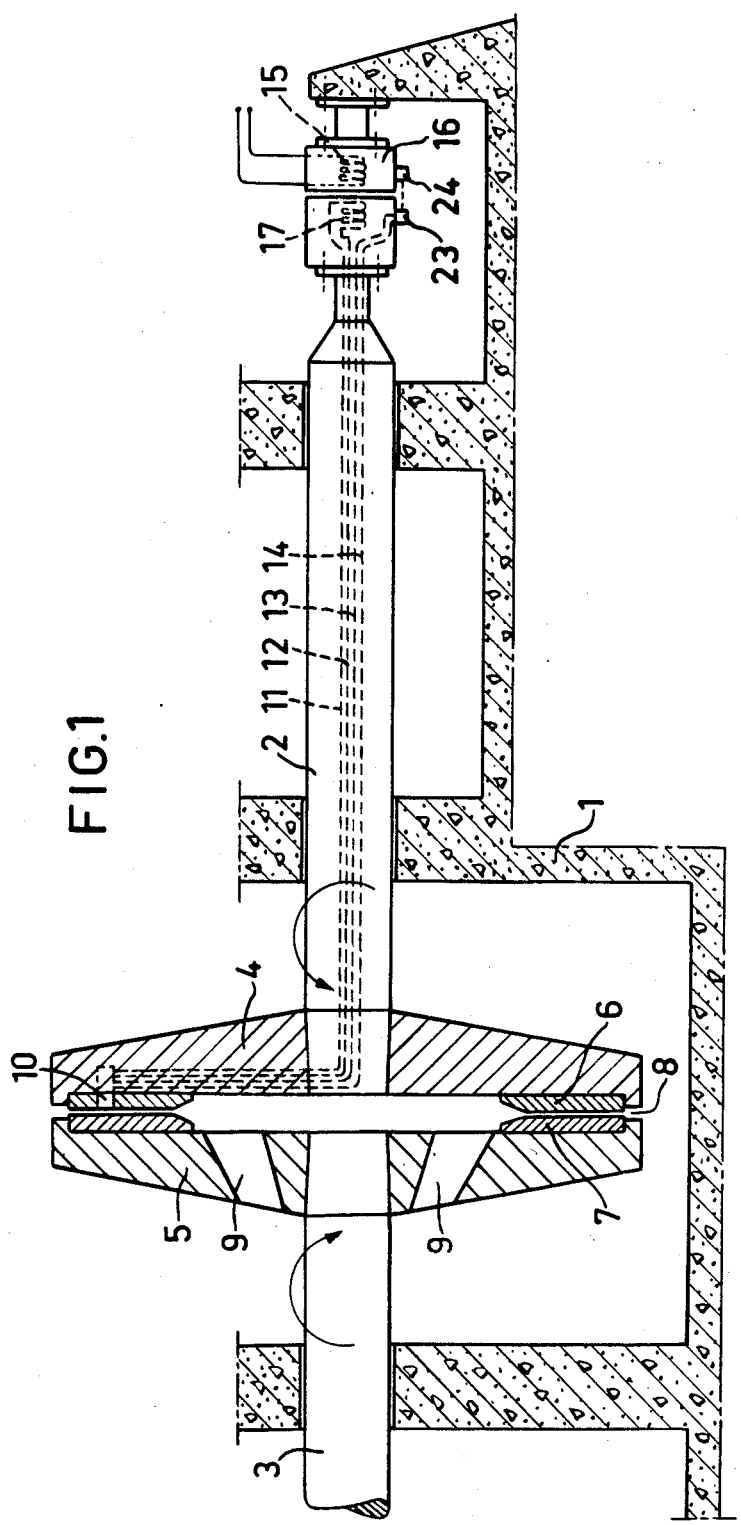
FIG. 1 shows a schematic representation of a side view of an apparatus in accordance with the present invention.

Referring to the figures, in which like numerals refer to like portions thereof, the embodiment illustrated in FIG. 1 comprises a stand 1, which carries two rotatable axles 2 and 3, respectively, each of which is provided with a refiner disc 4 and 5, respectively. On discs 4 and 5 beating members 6 and 7, respectively, are mounted, so that a gap 8 is defined between the two discs. In one of the refiner discs, 5, apertures 9 are provided for the supply of lignocellulose-containing material, which is intended to be refined while passing outward through the gap between counter-rotating discs 4 and 5.

In refiner disc 4 a transmitter 10 is provided for gap indication or measurement. Transmitter 10 is located in a beating member 6 as an integral part of its surface, so that the transmitter is subjected to the same degreee of wear as is beating member 6, itself. By this arrangement, it is possible to measure the actual gap at any moment, and this is a prequisite for preventing metallic contact between these refiner discs. A transmitter which is particularly suitable for this purpose is described in U.S. Pat. No. 4,387,339, which is incorporated herein by reference thereto.

The transmitter 10 receives its effective current supply through lines or circuits 11 and 12, which are drawn through axle 2, as are lines 13 and 14 for transfer of the measurement signals. The current transfer is carried out by means of a transformer coupling, by means of which the current simply is transferred from a wire winding 15 through which current flows in a stator 16, to a concentric wire winding 17 which is connected to the axle 2. The effective current transfer thus takes place inductively, without contact between axle 2 and stator 16. According to the embodiment shown in FIG. 2, the wire winding 18 in a stator 19 is located radially outside of the rotating wire winding 20.

The embodiment shown in FIG. 1 is suitable for use in those cases where the end of axle 2 is free. In the embodiment shown in FIG. 2, however, the transfer can be made at a position along axle 2. This embodiment can therefore be suitable for use on longer axles.

The transfer of measurement signals from the transmitter 10 through lines 13 and 14 can be effected in a variety of different ways. For example, this transfer can be effected optically, magnetically, by radio signals, acoustic signals, etc. The essential feature, however, is that the transfer take place free of contact, so as not to affect the accuracy of the measurement itself.

In FIG. 2 an example of optical transfer is shown. A photo-diode 21 is located on stator 19 so as to scan the light from a number of dimly glowing lamps 22, which are positioned so as to rotate with the axle and to cover the entire revolution thereof. The measurement signal can control the frequency with which the lamps are ignited and extinguished. The photo-diode 21 then intercepts that frequency, so that in that manner the measurement signal has now been transferred free of contact. In a corresponding manner, other combinations of a second transmitter 23 and a receiver 24, responsive to the second transmitter 23, can also be arranged according to this invention. as is indicated in FIG. 1.

It will be understood that the embodiments described herein are merely exemplary and that a person skilled in the art may make many variations and modifications without departing from the scope of the invention. All such modifications and variations are intended to be included within the scope of the invention as defined in the appended claims.

What is claimed is:

1. Apparatus for measuring the gap between a pair of relatively rotating refiner discs including opposing faces for refining lignocellulose-containing material between said opposing faces comprising rotating means for rotating at least one of said refiner discs so that said pair of refiner discs rotates with respect to each other on opposite sides of a plane between said opposing faces, transmitter means incorporated into said face of said at least one rotating refiner disc for producing a measurement signal in response to changes in reluctance corresponding to changes in said gap, current supply means for supplying an electric current to said transmitter means, said current supply means including transformer means for contact-free transfer of said current to said transmitter means, stationary receiver means for receiving said measurement signal, and measurement signal transfer means for contact-free transfer of said measurement signals from said transmitter means to said stationary receiver means, wherein said rotating means includes an axle on which said at least one refiner disc rotates, wherein said measurement signal transfer means includes second transmitter means comprising a plurality of lamps mounted on said axle, wherein said transformer means includes a first winding mounted on said axle and a second winding stationarily mounted radially outside of said first winding, and wherein said stationary receiver means comprises a photodiode mounted radially outside of said second transmitter means.

2. The apparatus of claim 1, including means for rotating both of said refiner discs in opposite directions.

3. The apparatus of claim 1, wherein said second transmitter means is adapted to control a frequency with which said lamps are ignited and extinguished.

* * * * *